Sept. 2, 1969     L. J. AMLIN     3,464,141
FLOAT FOR FISHING LINES
Filed May 19, 1967

Lovis J. Amlin,
INVENTOR.
BY.

ATTORNEY.

United States Patent Office 3,464,141
Patented Sept. 2, 1969

3,464,141
FLOAT FOR FISHING LINES
Lovis J. Amlin, 13061 Fairview St.,
Garden Grove, Calif. 92640
Filed May 19, 1967, Ser. No. 639,761
Int. Cl. A01k 93/00, 91/00
U.S. Cl. 43—43.11                   1 Claim

ABSTRACT OF THE DISCLOSURE

A float or bob for fishing lines having a buoyant spool for winding and unwinding predetermined lengths of line in two discrete channels on the spool. The float also has a one-piece disk-shaped annular buoyant member having a shaft extending from the center of its closed side. A collar having line guide means is affixed to the disk-shaped member. The spool is rotatably mounted on the shaft, and the channels are completely contained within the collar. The float permits suspension of a sinker-hook assembly to any adjustable depth beneath the surface of the water or immediately adjacent the float.

---

This invention relates to a bob or float for a fishing line. More particularly, the invention relates to a float from which a fishing hook and/or weight (herein called the sinker) may be suspended a predetermined depth beneath the surface of the water. The bob of the invention is especially but not necessarily exclusively suitable for fishing by casting with a rod and reel.

It is well known by fishermen that by nature many fish prefer to habitate in water of some particular temperature which may vary with the species of the fish as well as with the season and/or life cycle of the fish. It is also known that the stratum of water of the preferred temperature may vary in depth beneath the surface depending upon currents and, again, the season. For this reason it is customary for fishermen to suspend a thermometer into the water to determine the depth of the desired temperature stratum and then adjust the length of the fishing line between the float and the hook-sinker assembly so that the hook is suspended in the desired temperature stratum of water.

Heretofore the floats or bobs of the prior art comprised nothing more than a buoyant body such as a cork or piece of wood to which the fishing line was attached generally in a fixed manner. No matter how the fishing line was secured to the float, it will be understood that the length of the line between the float and sinker-hook assembly was fixed. Normally in casting, the line is drawn up to the end of the fishing rod as far as possible. Thus, in the case where the fisherman desires to fish in a stream by casting his line from a fishing rod, it is necessary to hold the rod back over the shoulder and snap it forward. If a float or bob is used, there is always an undesirable length of line between the float and the sinker hook assembly hanging from the end of the fishing rod since the float is drawn up tight against the end of the fishing rod.

It is therefore an object of the present invention to provide an improved float for fishing lines.

Another object of the invention is to provide an improved float for fishing lines which float readily permits adjustment of the length of the line between the float and the sinker-hook assembly.

Another object of the invention is to provide an improved float for fishing lines which float not only readily permits adjustment of the length of the line between the float and the sinker-hook assembly but which also permits this length of the line to be minimal when the line and hence the float is reeled in tight against the end of the fishing rod.

Yet another object of the invention is to provide an improved float for fishing lines which permits the line between the float and the sinker-hook assembly to be adjustable in length and reeled in when the fishing line is reeled in.

These and other objects and advantages of the invention are realized by providing a buoyant float in which a spool is mounted and to which spool the fishing line running from the rod, for example, is secured and upon which it may be wound. Likewise secured to the spool is the portion of the fishing line from which the sinker-hook assembly is suspended. When that portion of the fishing line between the float and the rod is reeled in, the spool in the float is rotatably driven thereby as this portion of the line unwinds. This rotation of the spool results in winding the length of the fishing line between the float and the sinker-hook assembly until this assembly is drawn up tight against the float. Upon continued reeling in of the line toward the fishing rod, ultimately the float and sinker-hook assembly are drawn up tight against the end of the rod with no unwanted length of line hanging from the end of the rod. In this position, the float and sinker-hook assembly may be readily and controllably cast by snapping the fishing rod in the customary fashion. When the float comes to rest upon the surface of the water, the sinker-hook assembly will now by gravity cause the spool in the float to rotate and unwind the portion of the between the float and the sinker-hook assembly so as to permit this assembly to be suspended to a depth of water depending upon the length of the line between this assembly and the point of attachment to the spool. The unwinding of this portion of the line results in winding a portion of the line between the rod and the float upon the spool so that the sinker-hook line may again be reeled in and brought up tightly against the float. The means provided in the float spool for securing the line thereto is adapted to permit ready change or adjustment in the length of line to the sinker-hook assembly.

The invention will be described in greater detail by reference to the drawings in which.

Figure 1:
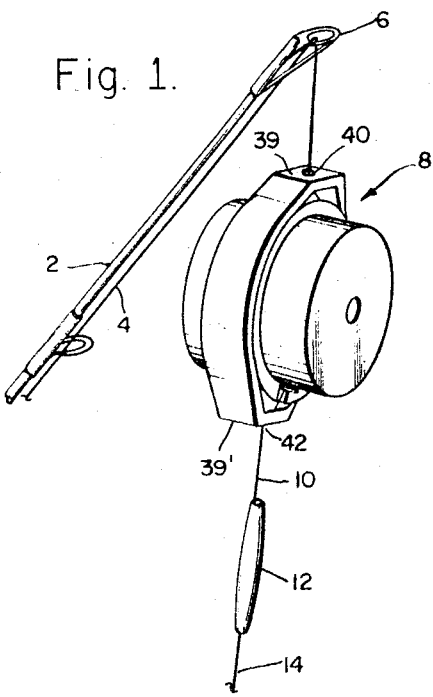
FIGURE 1 is a perspective view of a portion of a fishing rod and the float assembly of the invention.

In FIGURE 1, a portion of a fishing rod 2 is shown having a length of line 4 running from the customary reel (not shown) through an eyelet assembly 6 at the end of the rod 2 and thence to the float assembly 8 of the invention to which the line is secured in a manner to be described in greater detail hereinafter. Depending from the float assembly 8 is another length 10 of line which is secured to a sinker 12 to which a hook 14 is affixed. It will be understood that the length of line 10 is also secured to the float assembly 8 and may be either a continuation of the line 4 or a separate length of line as will also be described in greater detail hereinafter.

Figure 2:
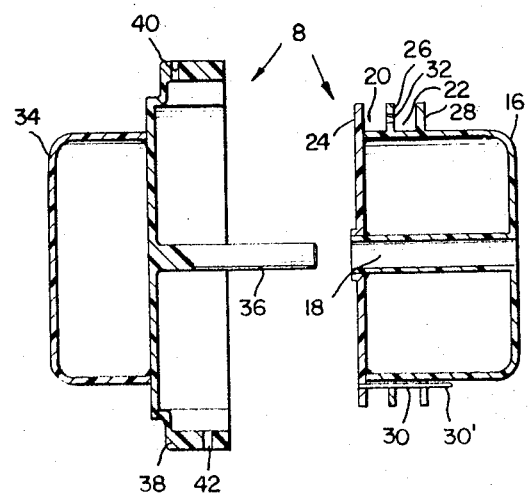
FIGURE 2 is a cross-sectional view in elevation of the float assembly of the invention according to an embodiment thereof, the float being shown as disassembled for conveniences of illustration.
Figure 3:
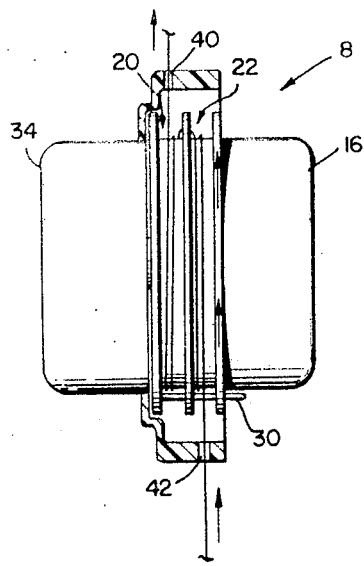
FIGURE 3 is an elevated view partly in section of the float assembly of the invention showing how the fishing line is wound thereon.
Figure 4:
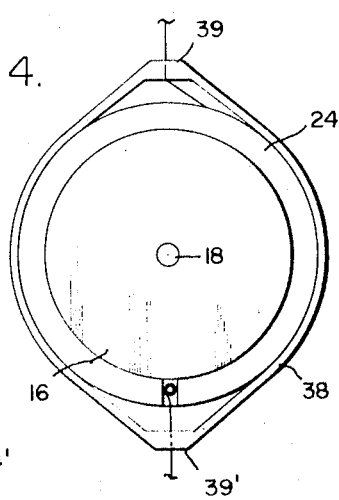
FIGURE 4 is an end view of the float assembly shown in FIGURE 3.

With additional reference to FIGURES 2, 3 and 4, the float assembly 8 of the invention comprises a spool member 16 which may also comprise an air-filled, hermetically sealed (and hence buoyant) container having a shaft-way 18 therein. The spool member 16 may be in the form of a cylinder and of plastic material, for example, with the shaft-way 18 being co-axial with respect to the central axis of the cylinder. Disposed around the outside of one end of the spool 16 are a pair of adjacent channels or spool winding sections 20 and 22 formed by walls or ridges 24, 26 and 28 which may also be of plastic material and formed integrally with the spool 16. The spool channel 20 may be utilized for winding a portion of the length of the line 4 thereon from the rod-reel side of the float assembly 8 and is referred to hereinafter as the rod-line channel. The spool channel 22 may be utilized for winding a predetermined length of the line 10 thereon from the sinker-hook assembly 12–14 and is referred to hereinafter as the sinker-hook line channel. Also provided on a portion of the spool is a means 30 for securing the line to the spool. Although it will be understood that other suitable means may be provided on the spool for this purpose, the means shown in this embodiment is a steel pin 30, for example, having a free end 30' near the sinker-hook channel 22 for looping one or more turns of the line thereabout and thus securing the line to the spool 16. If a continuous length of fishing line between the rod 2 and the sinker-hook assembly 12–14 is utilized, then only a single means need be provided on the spool 16 for securing the line thereto. However, in such an arrangement, some means needs to be provided for permitting the line to cross from the rod-line channel 20 to the sinker-hook line channel 22 through the intervening wall or ridge 26. This may be accomplished by providing a slot or hole 32 in the wall 26 which separates the two channels 20 and 22. Preferably, a hole is used for this purpose since it positively "captures" the line therein and prevents it from jumping up and riding on the wall 26 as might happen in the case where a slot is utilized. It will be appreciated, however, that a slot cross-over has been satisfactorily employed for this purpose without any such difficulty.

As will be understood when the operation of the float assembly of the invention is described hereinafter, the rod-reel portion 4 of the line is wound on the spool 16 simultaneously with the unwinding of the sinker-hook portion 10 of the line and vice versa. When winding and unwinding relatively large lengths of line, it is desirable to keep the two portions of the line separated so that the respective turns thereof on the spool do not become entangled or otherwise interfere with the winding and unwinding of the line. Hence, the embodiment showing the two-channel arrangement is a preferred embodiment. However, due in part at least to the cross-sectional smallness of the conventional fishing line which is usually of nylon, it has been found that a small number of turns may be wrapped on a single spool channel and operation of the float of the invention is satisfactory since a small number of turns of fine line permits the winding and unwinding turns to slip past one another without entanglement or interference.

The other portion of the float assembly likewise may comprise a one-piece, disk-shaped annular buoyant member having a shaft extending from the central portion of a closed side thereof. This member may comprise an air-filled, hemetically sealed (and hence buoyant) container 34 which, like the buoyant spool member 16, may also be formed of plastic. While buoyancy of the float assembly is described herein as being achieved by use of air-filled hermetic containers, it will be understood that other structures having buoyant properties may be employed to equal advantage. For convenience, the portion 34 of the float assembly 8 is referred to herein as the outer float portion. A shaft 36 is provided co-axially with respect to the central axis of the cylindrically-shaped container 34 and may also be of plastic formed integrally as a part thereof. Alternatively, the shaft 36 may also be formed of metal such as stainless steel, for example. The shaft 36 may have a length substantially equal to the length of the spool 16. The outer float portion 34 is also provided with a flange-like collar portion 38 of greater diameter than the diameter of the container 34. Portions 39 and 39' (shown best in FIGURES 1 and 4) of the exterior surface of the collar 38 disposed 180° apart may be flattened and provided with holes 40 and 42 therethrough. The inside diameter of the collar portion 38 is chosen so as to accommodate the diameter of the wall portions 24, 26 and 28 of the spool member 16 with a minimum of clearance therebetween but still sufficient to permit free rotation of the spool 16 within the outer float portion 34 when assembled. The spool portion 16 is assembled into the collar portion 38 by inserting the shaft 36 of the outer float portion 34 in the shaft-way 18. The two assemblies may be held together by a slip-ring assembly (not shown), for example, on the end of the shaft 36 although any other suitable means may be employed for this purpose.

In operation, the fishing line from the sinker-hook assembly 12–14 is inserted through one of the openings in the collar portion 38 of the outer float assembly 34 and the length of line needed to suspend the sinker-hook assembly to a predetermined depth is determined. The line is then looped onto the securing means or pin 30 and then through the slot or hole 32 in the dividing wall 26 and wound around the rod-reel channel 20 on the spool 16. Assuming channels of equal diameter, the length of line wound in this channel should at least equal the length of line to be suspended from the float assembly to the sinker-hook assembly since the spool must be rotated by this portion of the line in order to wind up the line from the sinker-hook assembly. The line then passes out through the other hole 40 of the collar portion 38 and on up to the fishing rod 2 and eventually is wound up on the conventional reel. It will be understood that the turns of the line wound up on the spool represent definite lengths of line and the unit "turn" is used merely for convenience of expression.

When, by the conventional reel, the line is wound in, the turns on the rod-reel channel 20 are unwound therefrom and drawn up the rod to the main reel. Hence, the turns on the rod-reel channel are reduced by a number equal to the turns wound onto the sinker-hook channel by the rotation of the spool 16, this rotation being accomplished by the unwinding of the rod-reel portion of the line. Once the sinker-hook assembly 12–14 has been drawn tight against the float assembly 8, the spool 16 can no longer be rotated and the whole assembly comprising the float 8, the sinker 12, and the hook 14 are lifted and drawn up tightly against the rod by the continued reeling in of the line onto the main reel.

Upon casting the line, the float and sinker-hook assembly sail through the air as the line is paid out from the main reel. Upon landing upon the water, the sinker-hook assembly 12–14 sinks by gravity down into the water and unwinds this portion of the line from the sinker-hook channel 22 which causes the spool 16 to rotate and wind a corresponding number of turns or length of line upon the rod-reel channel 20. The sinker-hook assembly will sink beneath the water to a distance equal to the length of the line therefrom to the point at which this portion of the line is secured to the spool 16. The length of this portion of the line is readily adjusted simply by unfastening the line from the securing means or pin 30 and pulling as much line as needed through the float assembly and then securing the line again to the pin 30 as aforesaid, care being taken to make sure that at least an equal length of line is still wound on the rod-reel channel 20.

In order to insure proper rotational direction of the spool 16, it will be appreciated that the line between the rod and the float must be wound on the spool in the opposite direction from which the line between the float and sinker-hook assembly is wound, since what is desired is a simultaneous winding and unwinding of the respective portions of the line for a given direction of spool rotation. When the divided or two-channel embodiment is utilized, this simply means that the line in the rod-reel channel 20 must be wound thereon in the opposite direction from the winding on the sinker-hook channel 22. This normally is accomplished simply by paying out the line from the float to the sinker-hook assembly and then reeling the line in.

Figure 5:
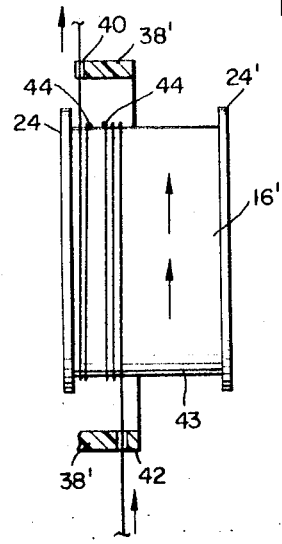
FIGURE 5 is an elevated view partly in sections of another embodiment of a spool suitable for use in the float assembly of the invention.

With particular reference to FIGURE 3, it will be appreciated that by laterally offsetting the holes 40 and 42 or, in other words, by locating one hole above the rod-reel channel 20 and one below the sinker-hook channel 22, any tendency of the line to wind up on the wrong channel is greatly reduced. This is particularly advantageous in connection with the embodiment illustrated in FIGURE 5 wherein a single channel spool 16' is utilized. In this embodiment, the line is wound up on the spool in a single channel 43 formed between ridges or walls 24 and 24' which are provided in order to keep the line from slipping off the spool altogether. As noted previously, this single-channel arrangement is feasible providing there is not a great number of turns required to be on the spool so that in the simultaneous winding and unwinding of the line the turns can slip past one another. This action is facilitated by keeping the respective differently wound turns on different portions of the spool as much as possible which result in enhanced by the offset feed hole arrangement shown in FIGURE 5. The embodiment in FIGURE 5 also demonstrates that it is not necessary to use one continuous line for the purposes of the invention providing each section of the line (that is, the rod-reel section and the sinker-hook section) is secured as by pins or other means 44 to the spool 16'.

There thus has been shown and described an improved float or bob for fishing lines which permits a sinker-hook assembly to be suspended beneath the surface of the water to any desired depth after the float has come to rest on the surface of the water and until which the sinker-hook assembly is held tightly against the float assembly of the invention. This desirable operation is achieved by a float assembly which is relatively inexpensive to manufacture and which in operation is trouble-free and permits ready adjustment at any time when in use of the length of the line between the float and the sinker-hook assembly.

What is claimed is:
1. A float for suspending a fishing hook and sinker assembly therefrom comprising:
 (1) a bouyant rotatable spool having two discrete annular channel-forming portions disposed on the exterior surface thereof whereby a length of fishing line from a hook and sinker assembly may be wound in one of said channel-forming portions and another length of fishing line from a fishing rod may be wound in the other of said channel-forming portions;
 (2) means affixed to said spool for adjustably securing said lengths of fishing line thereto;
 (3) and a one-piece, disk-shaped annual buoyant member having a shaft extending from the central portion of the closed side of said disk-shaped member, said rotatable spool being mounted on said shaft, said shaft having a length substantially equal to the length of said spool, said disk-shaped member having guiding means comprising an annular collar portion affixed to said disk-shaped member and in which said channel-forming portions are completely contained when said spool is mounted on said shaft for guiding said lengths of fishing line onto respective ones of said channel-forming means.

References Cited

UNITED STATES PATENTS

| 2,190,113 | 2/1940 | Chreitzberg | 43—43.11 |
| 2,497,355 | 2/1950 | Hagen | 43—43.11 X |
| 3,141,256 | 7/1964 | McBriar | 43—43.11 |
| 3,340,644 | 9/1967 | Lintz | 43—43.11 |

SAMUEL KOREN, Primary Examiner

JAMES H. CZERWONKY, Assistant Examiner

U.S. Cl. X.R.

43—44.87